United States Patent [19]
Macleod

[11] Patent Number: 5,218,658
[45] Date of Patent: Jun. 8, 1993

[54] LIGHTWEIGHT SUBMARINE OPTICAL CABLE

[75] Inventor: Andrew J. Macleod, Winchester, United Kingdom

[73] Assignee: Northern Telecom Limited, London, England

[21] Appl. No.: 825,539

[22] Filed: Jan. 24, 1992

[51] Int. Cl.⁵ .............................................. G02B 6/44
[52] U.S. Cl. ................................ 385/107; 385/100; 385/103
[58] Field of Search ............... 385/107, 100, 103, 113, 385/101, 102, 104, 105, 106

[56] References Cited

U.S. PATENT DOCUMENTS

| | | | |
|---|---|---|---|
| 4,371,234 | 2/1983 | Parfree et al. | 385/107 X |
| 4,671,611 | 6/1987 | Allemand et al. | 385/107 |
| 4,679,898 | 7/1987 | Grooten | 385/107 |
| 4,971,420 | 11/1990 | Smith | 385/107 |
| 5,125,061 | 6/1992 | Marlier et al. | 385/107 X |

Primary Examiner—Georgia Y. Epps
Assistant Examiner—Phan Thi Heartney
Attorney, Agent, or Firm—Lee, Mann, Smith, McWilliams, Sweeney & Ohlson

[57] ABSTRACT

In a submarine optical cable for unrepeatered links the conventional wire armouring is replaced by a metal tape (7), the central strength member (4) providing the main tensile strength in the armoured cable. The advantage is lower cost, increased torsional stiffness and reduced cable diameter. Typically the tape (7) is corrugated to enhance the flexibility of the cable.

5 Claims, 1 Drawing Sheet

LIGHTWEIGHT SUBMARINE OPTICAL CABLE

This invention relates to optical fibre submarine cables, particularly such cables which are armoured. The invention further relates to optical fibre cable constructions for unrepeatered links.

BACKGROUND OF THE INVENTION

When a submarine cable is to be laid in shallow waters, e.g. to provide a short haul or medium haul link, it has been conventional practice to provide heavy wire armouring to protect the cable from ships' anchors and trawls, particularly beam trawling equipment. Further, as conventional cables incorporate a high voltage power supply for repeater operation it has been necessary to provide relatively thick insulation. The cable is then relatively bulky and presents a handling problem. Even for the installation of a relative short link, it is necessary to bring a dedicated cable laying ship to the cable manufacturing installation so that the cable may be loaded into the ship. It will be appreciated that this procedure can present a severe logistics problem e.g. when the cable installation path is remote from the factory and/or when the cable ship has to be recalled from a remote location for loading the cable. This can represent a significant factor in the cost of an installation.

In recent years there have been two major developments in cable technology. The first has been an improvement in optical fibre quality which, coupled with developments in optoelectronic technology, has rendered repeaterless links feasible over short and medium haul distances, e.g. between the United Kingdom and Belgium. The second development has been in cable burying technology, whereby the cable may be laid in a ploughed trench to provide protection from the aforementioned shipping activities. It is generally considered that damage from shipping is unlikely to occur at depths greater than about 550 meters.

Various workers have addressed the problem of providing lightweight armoured cables for land use. One such construction is detailed for example in specification No. GB-A-2186098 which describes the use of tape armour for protection e.g. against rodents. However, it will be appreciated that developments in land cables cannot be readily adapted to submarine cable technology as the conditions under which the cable are installed and the environments which they must withstand are so different. For example, a submarine cable must have sufficient tensile strength to withstand the laying process and must also provide effective protection of the transmission package against hydrostatic pressure.

It is an object of the invention to provide a lightweight armoured submarine optical cable.

It is a further object of the invention to provide a submarine cable that is of reduced diameter whereby to facilitate shipping and installation.

It is a further object of the present invention to provide a submarine optical cable of the kind described having a cost-effective armouring.

SUMMARY OF THE INVENTION

According to the invention there is provided a lightweight submarine optical cable for repeaterless transmission, the cable including a transmission package and a plurality of stress members enclosed in a metal pressure tube, a plastics sheath surrounding the pressure tube, and a steel tube surrounding and tightly engaging the sheath, wherein said steel tube provides armouring of the cable and said strength members provide the main tensile strength of the cable.

According to the present invention there is further provided a lightweight submarine optical cable for repeaterless transmission, the cable including a central transmission package incorporating a plurality of optical fibres disposed around a King wire and enclosed in a metal tube, a plurality of tensile strength wires disposed around said tube and enclosed in further metal tube, said further tube providing a pressure tube for the transmission package, a first plastics insulation sheath disposed around the further tube, a steel tube tightly engaging the first plastics sheath, and a further plastics sheath surrounding and tightly engaging the steel tube, wherein said tube provides armouring of the cable and said strength wires provide the main tensile strength of the cable.

We have found that the use of a metal tape armour significantly reduces manufacturing costs in comparison with a conventional wire armour whilst still providing the cable with sufficient protection for both laying and recovery conditions. Advantageously the tape is corrugated to enhance the flexibility of the cable.

In this cable construction the steel tube provides mainly an armouring function while the tensile strength of the cable is provided primarily by the wire strength members. This contrasts with a conventional wire armoured cable in which a significant part of the tensile strength is provided by the wire armour.

BRIEF DESCRIPTION OF THE DRAWINGS

In order that the invention can be clearly understood reference will now be made to the accompanying drawings in which:

Referring to FIGS. 1 and 2 the cable comprises an optical fibre package 1 housed in a metallic pressure tube 2 which in this embodiment is made of mild steel. The package 1 comprises a copper clad steel wire 1A, in this embodiment having a nominal outer diameter of 0.7 mm, embedded with a plurality of acrylic coated single mode fibres 1B, each with a nominal outer diameter of 0.25 mm. These fibres 1B and the copper clad steel wire 1A are laid straight and embedded in an extruded thermoplastic elastomer 1C.

Between the outer surface of the package 1 and the inner surface of the tube 2 is a water blocking compound 3.

The outer diameter of the mild steel tube 2 is in this embodiment 4.5 mm.

Figure 1:
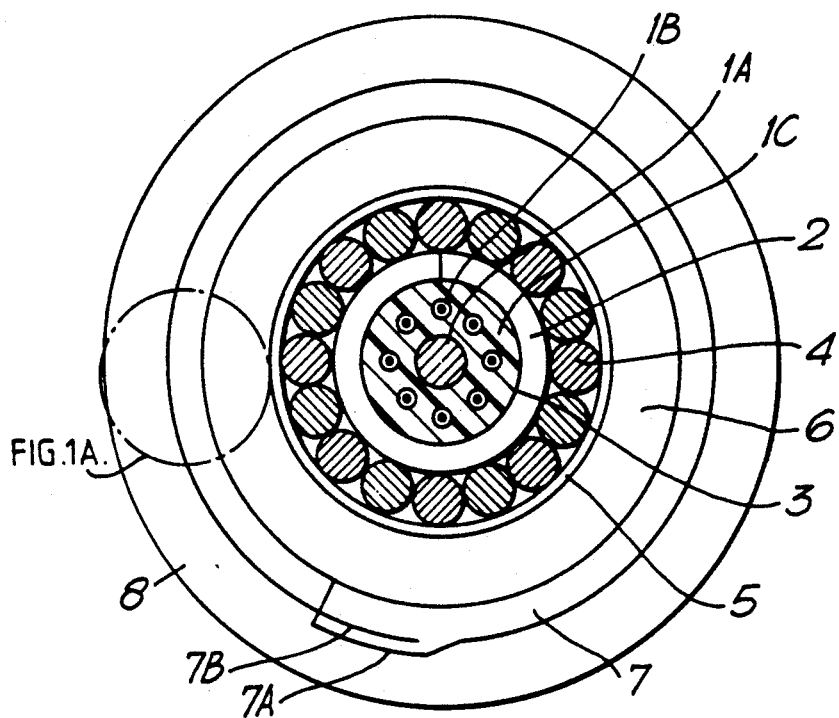
FIG. 1 shows in cross section an optical fibre submarine cable according to an embodiment of the present invention.
Figure 2:
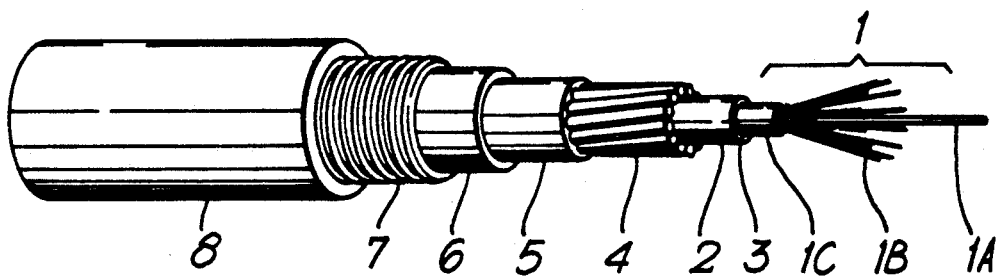
FIG. 2 illustrates a method of manufacturing the cable of FIGS. 1 and 1A.

Around the pressure tube 2 is a layer of high tensile steel wires each having a nominal diameter of 1.53 mm in this embodiment. They are laid with a left-hand lay, the angle of lay being less than 10° and in this embodiment about 4°, Around the strength members is formed a copper tube 5 which is partly swaged into the interstices of the strength member wires and this aspect is shown more clearly in FIG. 2, the copper tube being shown schematically in FIG. 1. The copper tube is hermetically sealed as by welding longitudinal edges of an applied copper tape, and this prevents hydrogen causing transmission loss in the fibres with the passage of time.

Around the copper tube, which has approximately 8 mm outside diameter, is extruded a plastics layer 6 of high density polyethylene insulation having a nominal outer diameter of approximately 11 mm.

Around the electrical insulation 6 is formed an adhesive coated corrugated mild steel tape 7 having overlapped longitudinal edges 7A and 7B. In this embodiment the adhesive is a hot melt adhesive pre-coated on both sides of the mild steel tape. In this embodiment the tape has a thickness of 155 microns and the coating a thickness of about 60 microns on either side.

Figure 1A:
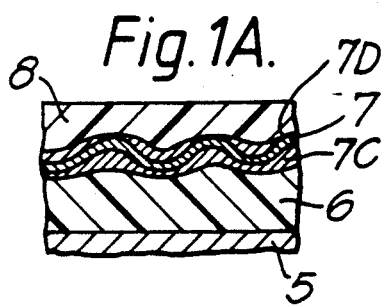
FIG. 1A shows in perspective the cable of FIG. 1 with the various parts exposed.

As the tape is formed around the insulation 6, corrugated with the overlapped edges in place, an outer plastics sheath 8 of high density polyethylene is extruded over the corrugated tape 7 and the heat of extrusion causes the coatings 7C and 7D on either side of the tape 7 to bond to the plastics insulation 6 and to bond also to the sheath 8. FIG. 1A shows in detail an axial section of the part of the cable to illustrate how the insulation 6 has surface indentations which are formed during the extrusion of the sheath 8.

The advantage of the proposed form of armouring in place of conventional steel wire armouring, is that it is substantially cheaper and provides increased torsional stiffness to the cable whilst being torsionally balanced and therefore not generating torque under load as is the case for traditionally armoured cables. This is important when the cable is being laid e.g. on the sea bed since any residual torsion set up in the cable by, for example traditional strength member wires, can cause the cable to throw loops on the sea bed which is very undesirable or during laying in storage tanks. The proposed armouring will help prevent this by providing increased torsional stiffness whilst being torsionally balanced.

The cable described has a nominal outer diameter of just under 16 mm with a specific gravity of 2.2 grams per cubic centimeter. It has an ultimate tensile strength of 50 kN, and insulation resistance better than $5 \times 10^{11}$ ohms per kilometer and a composite conductor resistance of less than 1.5 ohms per kilometer. The small diameter of the cable corresponds to a stowage factor of 0.24 m $^3$km$^{-1}$. This compares very favourably with an equivalent conventionally armoured cable having a diameter of about 30 m and a stowage factor of 0.79 m $^3$km$^{-1}$. This low stowage factor reduces the total volume of cable required for an installation. In particular this reduction in volume allows shipment of the cable by road or in a non-dedicated vessel for transfer to a cable laying ship at the laying site. Alternatively, as the volume of cable is small, the cable may be stowed in the hold of a coaster vessel temporarily converted for cable laying operations. A temporary conversion for cable laying purposes is described in our U.S. patent application Ser. No. 07/737,813 now U.S. Pat. 5,080,530 corresponding to European application No. 90 302 568.2/ The specific gravity has been found sufficient to ensure sinking of the cable into a buried trench during laying.

The armouring 7 can have a thickness in the range 100 microns to 0.5 mm. The hot melt adhesive layers in this embodiment are, medium density polyethylene coating. The corrugations have a peak-to-peak spacing in the range 0.8 to 1.5 mm. Although the armour tape is relatively thin we have found that it provides adequate protection for a buried cable during installation and in-service conditions.

In this cable construction the tape 7 provides primarily an armouring function, the tensile strength of the cable being provided primarily by the strength members 4. We have found that this is adequate for shallow water applications where between 2 and 4 kilometers of cable may be suspended between the laying vessel and the sea bed during cable laying operations.

As can be seen in FIG. 1A, any air entrapment between the underside of the tape 7 and the insulation 6 is minimal if not eliminated by the combination of adhesive layer 7C and the deformation of the surface of the insulation 6 which effectively "fill" the troughs in the corrugated tape.

As an alternative or in addition to adhesive layer 7C described, a hot melted adhesive could be applied onto the tape by an applicator as it is wrapped around the insulation layer 6 to glue it to the layer 6. Furthermore it would be possible to rely solely on penetration during extrusion of sheath 8 into the interstices of the corrugations to provide the necessary adhesion between sheath 8 and tape 7 without the need for adhesive layer 7D.

It would be possible, but more expensive to use a metal other than mild steel for the armour tape 7, for example a different grade of steel.

Instead of the copper tape 5, fibres could be individually protected against the affects of hydrogen by individual hermetic coatings. However, for telemetry and/or electroding purposes the resistance of the combination of items 5, 4 and 2 need to be less than say 5 ohms per kilometer to allow for electrical in-service fault location.

The corrugated form of the tape and the use of the adhesive provides both flexibility of the cable and a very firm bond to the plastics sheath. This bond is sufficiently strong to withstand the high strain imposed on the cable by a cable engine during the laying process.

I claim:

1. A lightweight submarine optical cable for repeaterless transmission of optical signals, the cable comprising a central transmission package incorporating a plurality of optical fibres disposed around a King wire and enclosed in a first steel tube, a plurality of tensile strength wires disposed around said first tube and enclosed in a second metal tube, said second tube providing an hermetic barrier whereby to prevent the ingress of hydrogen to the transmission package, a first plastics protective sheath disposed around the second tube, a third metal tube tightly engaging the first plastics sheath, said third tube being formed from a steel tape applied longitudinally with overlapping edges to the sheath, and a further plastics sheath surrounding and tightly engaging the third tube, wherein said third tube provides both armouring and torsional stability of the cable and said strength wires provide the main tensile strength of the cable.

2. A cable as claimed in claim 1, wherein the steel tape is transversely corrugated.

3. A cable as claimed in claim 2, wherein the steel tube is made of a material selected from the group comprising mild steel, stainless steel and high strength ferrous alloys.

4. A cable as claimed in claim 1, wherein the cable outside diameter does not exceed 25 mm.

5. A cable as claimed in claim 4, wherein the thickness of the steel tube lies in the region 150-500 um.

* * * * *